Nov. 29, 1966

C. SCHMALE ETAL
3,287,804
CLOTH CUTTING DEVICE WITH SEMI-AUTOMATIC FIELD

Filed Sept. 20, 1963

INVENTORS
Carl Schmale &
Hans Freermann

BY Spencer & Kaye

ATTORNEYS

INVENTORS
Carl Schmale &
Hans Freermann

BY *Spencer & Kaye*

ATTORNEYS

United States Patent Office 3,287,804
Patented Nov. 29, 1966

3,287,804
CLOTH CUTTING DEVICE WITH SEMI-AUTOMATIC FIELD
Carl Schmale and Hans Freermann, Ochtrup, Westphalia, Germany, assignors to Firma Carl Schmale, Ochtrup, Westphalia, Germany
Filed Sept. 20, 1963, Ser. No. 310,346
Claims priority, application Germany, Sept. 20, 1962, Sch 32,060; Aug. 22, 1963, Sch 33,747
24 Claims. (Cl. 30—131)

The present invention relates generally to the cloth cutting art, and, more particularly, to a semi-automatic device for transversely cutting cloth webs to predetermined lengths, such arrangement including a feed device which brings the places at which the web is to be cut into the region of a manually operated shears.

Despite the fact that there exist automatic arrangements for transversely cutting material webs, for example, paper webs, cloth webs such as towel webs, are generally cut manually. The only help in the case of manual cutting, is an electrically driven shear. However, the material is advanced by hand.

All of the existing devices for transversely cutting material webs can not replace the cumbersome and time-consuming transverse cutting of cloth webs inasmuch as they do not meet the requirements which arise in the cutting of such webs.

In the case of cloth webs, the basic requirement is that the transverse cut is effected parallel to the filling or weft thread. Cloth webs, which generally have a pattern, have markings woven into them. These markings are spaced apart and serve as guides for the transverse cut and they correspond to the direction of the weft thread. If, then, it is desired to cut cloth webs along their markings on known automatic transverse cutting machines, the markings always had to be brought into alignment with the knife; but this is not possible. Due to the unstable structure of the web, the position of the marking oscillates or extends back and forth. That is to say, the weft thread is not at all times at right angles to the feed direction, particularly when the edges are thickened by longitudinal seams. But the markings wiggle not only out of line, they become twisted and wavy. Further, the distance between the markings is subject to large tolerances. Despite the fact that the markings are spaced apart by equal numbers of weft threads, the distance between individual markings will vary by as much as 20 millimeters. Finally, there are flaws in the weaving as the result of which the distance between two markings will be but a fraction of the usual length of the other sections.

All of the above characteristics of cloth webs make it impossible to use machines which can otherwise be used for transversely cutting other materials. It is true that various attempts have already been made to provide machines for transversely cutting cloth webs, but none has been found to be successful.

With these defects of the prior art in mind, it is a main object of the present invention to provide a semi-automatic device for transversely cutting cloth webs which takes into consideration all of the characteristics of cloth webs and the problems incident to the transverse cutting thereof.

Another object of the present invention is to provide a device which may easily be adjusted to the length of cut material desired.

A further object is to provide a device of the character described wherein manual adjustment of the correct material length may be made from material section to material section as desired and without changing the length of feed to which the device is adjusted.

These objects and others ancillary thereto are accomplished according to preferred embodiments of the instant invention wherein after each switching on of the feed device and feeding of the cloth web by a predetermined adjustable feed length, the feed device is turned off by an automatic control arrangement. The machine further comprises a manually operable control device for moving the feed arrangement and which allows a correction of the particular length by which the web has been advanced without changing the adjusted feed length. By virtue of this arrangement, it is still possible to provide a manually operated shear and to cut cloth webs along their transverse markings without involving the time-consuming and tiring hand movement otherwise necessary.

After the feed is triggered, the cloth web is advanced by a predetermined length and, if there are no excessively large tolerances of faults in the weave, it will lie in the region in which the cutting takes place. However, the marking can be brought to the cutting place by hand by properly operating the feed device and this will be necessary when, for example, there are flaws in the weave. Thus, the arrangement makes it possible to bring each individual section into the cutting position by hand, despite the presence of the automatic feed means. In this way, the particular feed length to which the device is adjusted is not affected, so that after the position of a particular marking has been adjusted manually, in the next cycle, the web will be advanced by the length to which the machine is set.

The present invention is characterized by a number of individual features. In particular, the arrangement according to the present invention is characterized by the fact that the feed arrangement comprises double pairs of rollers, which are preferably driven by chain drives. The arrangement according to the present invention is further characterized by a clutch and a brake provided in the transmission for the drive to the chain drives. There is a control disk detachably connected with one of the sprocket wheels and which cooperates with a switch. After a control cam of the disk engages the switch, it disconnects the clutch and turns the brake on. Due to this feature, the feed length is certain to remain constant at all times.

Additional objects and advantages of the present invention will become apparent upon consideration of the following description when taken in conjunction with the accompanying drawings in which.

Figure 4:
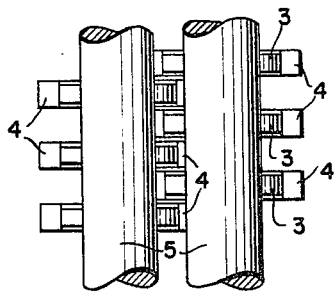
FIGURE 4 is a fragmentary elevational view showing a pair of rollers from the top.
Figure 3:
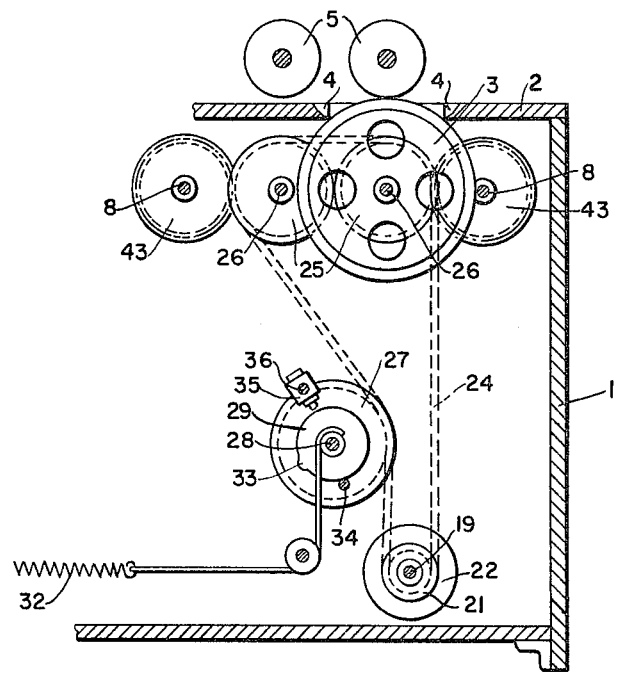
FIGURE 3 is an enlarged fragmentary sectional view taken substantially along the plane generally defined by line 3—3 of FIGURE 2.
Figure 5:
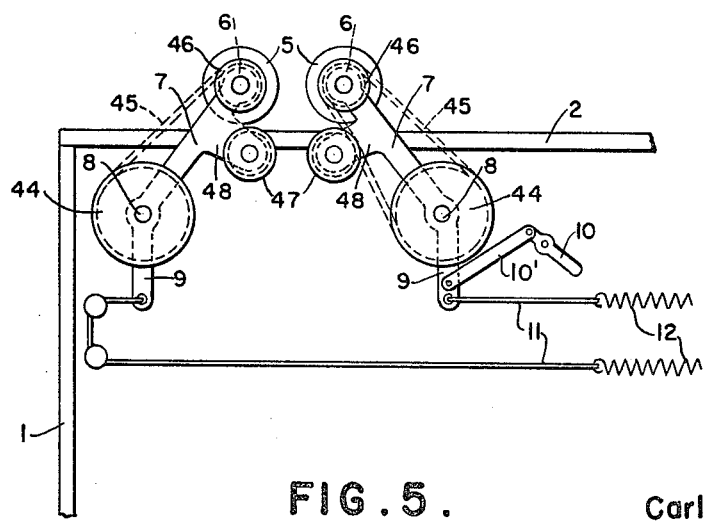
FIGURE 5 is a fragmentary view as seen in the direction of arrow C in FIGURE 2.
Figure 6:
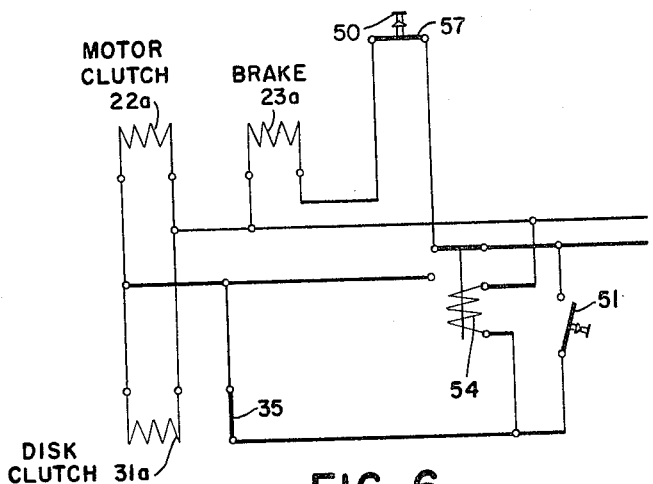
FIGURE 6 is a circuit diagram of the control circuit.

With more particular reference to the drawings, an arrangement is shown which comprises a closed frame 1 covered by a table plate 2 and which carries the entire mechanism. Arranged below the plate 2 are lower rollers 3 fashioned as disk rollers and extending through the plate 2. The disks forming the rollers 3 are stacked transversely of the transport direction. Troughs 4 are provided in the plate 2 as shown in FIGURES 3 and 4. The troughs prevent webbing, and particularly knot-like webbing, from being drawn between the plate 2 and the rollers 3. This effect is obtained because the troughs support the cloth web and serve as a scraper.

The upper rollers 5 are mounted in arms 7 by means of bearings and the arms 7 are pivotable about shafts 8. The structure further comprises lever arms 9 on which springs 12 are arranged, preferably via pull cables 11. These springs draw the rollers 5 against the lower rollers 3. In this way the upper rollers can yield against the action of the spring and adapt themselves to the particular thickness of the material. The oscillatable bearings 6 also allow one side of each upper roller 5 to yield so that these rollers can assume an inclined position. By this means the arrangement may adapt itself for handling cloth webs which have a seam on one side, for example. The rollers 3 and 5 can be mounted on both ends in mirror image symmetry. In order to introduce a cloth web between the rollers 3 and 5, the upper rollers 5 can be swung upwardly against the spring force by means of a lever 10 via a linkage 10' connected to lever arm 9.

The cloth webs are fed to the rollers 3 and 5 via a rod means 14 whose inclined position can be adjusted. Located in the region 1a of the frame there is a stacking device (not shown) in which the cut-off portions are stacked by themselves. The stacking device can, by means of a lever 15, be adjusted to the particular goods being handled. Located in the front wall 1b is a switch box 16 which carries the electrical gear.

Figure 2:
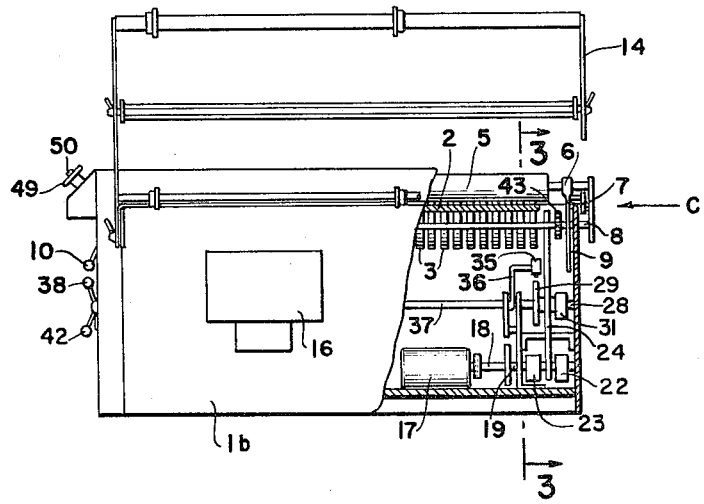
FIGURE 2 is a side elevational view, partly in section, of the machine as seen in the feed direction.

An electric motor 17 serves to drive the arrangement and once the arrangement is switched on the motor rotates continuously. A shaft 18 which (see FIGURE 2) is located behind the motor and is driven thereby drives a further shaft 19. The shaft 19 carries a sprocket wheel 21 which is in engagement, alternatively, with a clutch 22 or a brake 23. The sprocket wheel 21 is connected via a chain belt 24, with sprocket wheels 25 mounted on the axes 26 of the disk rollers 3.

The chain 24 is also engaged by a further sprocket wheel 27 which is mounted on an axle 28. The axle 28 further carries a control disk 29 and a clutch 31. The control disk 29 is axially displaceable and can be coupled by means of the clutch 31 with the sprocket wheel 27. The control disk has a cam 33 and when the control disk 29 is disengaged from the sprocket wheel 27, the control disk 29 is biased by a spring 32 so that the control cam 33 is drawn against an abutment 34.

The control cam 33 coacts with a switch 35. The latter is mounted on an arm 36 which is connected with an axle 37 which extends axially to the axle 28. The free end of the axle 37 has a lever 38 by means of which the axle 37 can be rotated, in consequence of which the starting or original angular position of the switch 35 with respect to the control 33 can be adjusted. An indicator 39 on the lever 38 shows, on a scale 41, the particular setting, i.e., the feed length. A lever 42 serves for locking the set position of the switch 35.

The upper rollers 5 are driven by the lower rollers 3. The axles 26 of the lower rollers 3 carry gears which, as shown in FIGURE 3, are behind the sprocket wheels 25 and which are in mesh with gears 43 carried by the shafts 8. Sprocket wheels 44 are mounted on the free ends of the shafts 8, which sprocket wheels 44 are connected, via chains 45, with the sprocket wheels 46 on the upper rollers 5. The chains 45 are engaged by tension rollers 47, which are mounted in legs 48 of the arms 7.

On the opposite side, the rollers 3, 5, are connected, via a similar drive, with a hand wheel 49. Arranged in the hand wheel 49 is a push button 50, which when it is depressed, releases the brake 23 and preferably connects the hand wheel 49 with the drive to the rollers 3, 5. In this way, it is possible by turning forwardly or backwardly, to manually correct the position of the markings of a cloth web which has been fed. Arranged beside the hand wheel 49 is a switch 51 for switching on the feed device and below this, there is a counter 52, of a type known per se. This counter is preferably so arranged that it can be set to a given number of sections and after this number of sections has been reached, the feed device can not be switched on anew. This is particularly advantageous when the cut-off sections are to be fed in groups of predetermined number to a further processing station.

Figure 1:
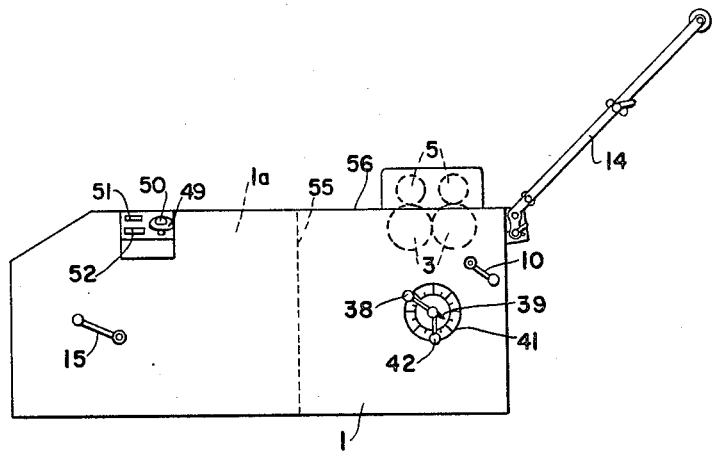
FIGURE 1 is a front elevational view of the machine.

The entire arrangement is preferably controlled electrically and the operation is as follows: After the desired feed length has been adjusted and the motor 17 turned on, the switch 51 is depressed. This closes the energizing circuit of a two position relay 54, but opens the control circuit again after it has been released. The relay 54 which has been thus turned on by the switch 51 opens the circuit to the switching magnet 23a of the brake 23 and at the same time closes the circuit to the switching magnets 22a and 31a of the clutches 22, 31. Furthermore, the circuit is closed by a switch 35 as a result of which the relay 54 remains turned on after the switch 51 has been opened. In this way, the feed device is coupled with the motor 17 and the control disk 29 is coupled with the sprocket wheel 27. The feeding commences, and the free end of the web shoots past the dashed line 55, illustrated in FIGURE 1, at which line the plate 2 ends and the web thereafter lays itself down over the stacking device located behind it.

When the control disk 29 which is carried along by the sprocket 27 has rotated sufficiently so that the control cam 33 engages the switch 35, the latter is opened and the current to the relay 54 is interrupted. The relay 54 switches back into the illustrated position and, simultaneously with the de-energization of the clutch magnets 22a, 31a, the braking magnet 23a is energized. As a result, the feed device stops and the web is ready for cutting with the marking approximately in the region 56 of the plate between the rear rollers and the dashed line 55. It is expedient if the plate 2, in this region, carries a marking which facilitates the cutting as well as the adjustment of the feed length.

Inasmuch as, with the de-energization of the control magnet 31, the control disk 29 is no longer coupled to the sprocket wheel 27, this disk 29 is pulled back into its starting position by spring 32. As a result, the switch 35 is again closed and when the switch 51 is again depressed, the web is again advanced over the same length.

If, then, due to tolerances in the individual sections, the marking shifts out of the region in which the cutting is done, or if the web contains a flaw which is to be cut out, the switch 57 is opened via the push button 50 in hand wheel 49. This de-energizes the braking magnet 23a and the feed rollers 3, 5, can be rotated in opposite directions by means of hand wheel 49.

For this reason, the hand wheel is connected with one of the feed rollers or the shaft 8 by means of a chain or belt drive, preferably via a clutch. This clutch can be turned on electromagnetically by the push button 50 or mechanically by the displacement of the hand wheel 49.

If a manual correction is to be effected by means of the hand wheel 49, nothing is changed in the adjusted feed length inasmuch as during the displacement, the control disk 29 is disconnected from the sprocket wheel 27 and therefore does not partake of its movement.

Naturally, the present invention is susceptible to modification. For example, instead of providing a clutch 22 and brake 23, which are connected to the motor 17, the motor itself can be a so-called stop-motor, or the entire electrical control system can be a mechanical system.

Figure 7:
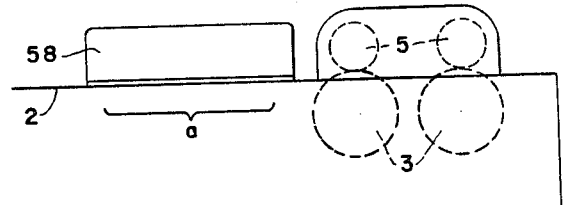
FIGURE 7 is a fragmentary schematic view of a further embodiment of the present invention as viewed from the front.
Figure 8:
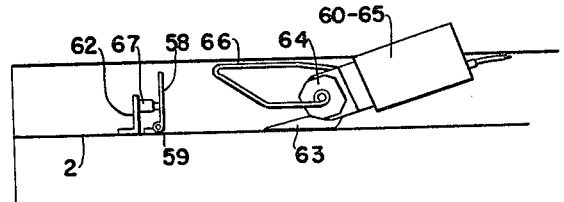
FIGURE 8 is a fragmentary schematic view of the structure of FIGURE 7 as seen in the feed direction.

According to FIGURES 7 and 8, a sheet or plate 58 with a hinge 59 is resiliently mounted on the table plate 2 behind the feed rollers 3, 5, in the cutting region a. A switch 61 is mounted on the plate 2 by means of an angle piece 62, the switch 61 being located in the cutting direction of a shear 60 behind the sheet or baffle 58.

The shear or cutting device comprises, as per se is known, a stationary knife 63 and a rotating polygonal knife 64 which is driven by a motor 65. According to the present invention there is mounted on the cutting device 60 a forwardly projecting wire yoke or loop 66. When the cutting device 60 runs off the web, the yoke 66 runs onto the baffle or plate 58, which yields resiliently and actuates the switch 61. In this way, the material feed may be turned on, and, by the time the cutting device is pulled back for the next cutting operation, the web has been advanced by the predetermined length and is ready to undergo the next cutting step.

Figure 9:
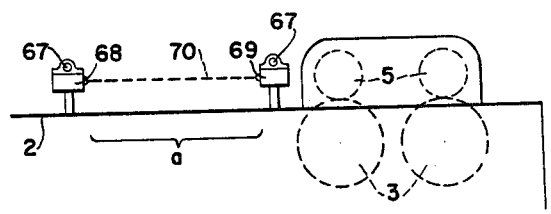
FIGURE 9 is a fragmentary schematic view of another embodiment of the present invention, as viewed from the front.

FIGURE 9 shows a photocell control system for the same purpose. The table 2 carries frames or brackets 67 which serve as rails, these brackets 67 extending above the web being advanced and over the entire width of the plate 2. The frames 67 are spaced apart a distance which corresponds to the cutting region $a$. One of the frames or yokes 67 carries a light source 68 and the other a photocell 69, both being displaceable in the direction of cutting.

The light beam cast by the light source 68 onto the photocell 69 constitutes a light barrier 70. When the cutting device 60 passes through this barrier 70, the light beam is interrupted and the photocell 69 switches on the material feed. In this embodiment the cutting device 60 is provided, in place of the wire loop 66, with an opaque disk, i.e., a disk through which light will not pass. The light source 68 and the photocell 69 are moved close to the edge of the web away from the operator and are so arranged with respect to each other so as to limit the path of the cutting device 60 until the web feed is turned on, by an amount corresponding to the width of the web.

It is within the scope of the present invention to make the components of FIGURES 7 and 8 displaceable, too. For this purpose, the resilient plate 58 can be mounted on rails, as was the case with the photo control device described above.

The purpose of various ones of the above described features is as follows: Because of the switch 35, which is actuated when the control cam 33 of disk 29 engages the switch and which causes disengagement of the clutch and engagement of the brake, the feed length is assured of always being constant.

The purpose of the adjustability of the angular position of the switch is to vary the feed length within a wide range. This makes it possible to use the machine according to the present invention to cut cloths materials such as towels, pot holders, and other different types of material.

The clutch for the chain drive and the clutch for the control disk 29 are connected in parallel, the clutch and brake actuated electromagnetically, and the switch in the circuit to the brake are provided in order to allow manual correction of the feed length.

Thanks to the above arrangement, the semi-automatic machine for cutting cloth webs transversely to predetermined lengths is turned on automatically. The machine does not have to be turned on by hand, instead, a constant work rhythm is obtained and this, in turn, increases the output of the machine. Once the operator is through with the cutting operation, the cutting means automatically turn on the feeding device. In this way, the web is advanced at the same time as the cutting means are pulled back for purposes of being ready for the next cutting operation. The only manual operation, thus, is to guide the cutting means along the marked cutting line and to pull the cutting means back after the cutting operation is completed.

It will be understood that the above description of the present invention is susceptible to various modifications, changes, and adaptations, and the same are intended to be comprehended within the meaning and range of equivalents of the appended claims.

What is claimed is:

1. An automatic device for the transverse cutting of cloth webs to predetermined lengths comprising, in combination:

manually operated cutting means disposed in a cutting region;

feed means for feeding a predetermined length of cloth web to present into the cutting region the portion of cloth where the cut is to be made; and automatic control means including clutch means and braking means for respectively initiating operation of said feed means when actuated and for stopping the feed means after a predetermined length is fed, said control means including means for adjusting the length of web which is intended to be fed upon each advance of the feed means, and manually operable means for releasing said braking means to correct a particular length which is fed without changing the feed length to which the control means are adjusted.

2. A device as defined in claim 1 wherein said feed means includes two pairs of rollers, drive means including chain drives for driving said rollers and including a transmission having a first clutch and a brake.

3. A device as defined in claim 2 wherein said automatic control means includes a switch connected in a circuit with a control for the first clutch and a control for the brake, and a control disk having a control cam thereon, the chain drive including a sprocket wheel to which said control disk is detachably connected, said switch being disposed within the path of movement of said control cam so that when the control cam first contacts the switch, the switch deenergizes the clutch control and energizes the brake control.

4. A device as defined in claim 3 wherein said means for adjusting the length of the web includes means for adjusting the original angular starting position of said switch with respect to the control cam of said control disk.

5. A device as defined in claim 4 wherein an axle is provided on which said control disk is displaceably mounted, which axle is connected to the corresponding sprocket wheel via a second clutch.

6. A device as defined in claim 5 wherein said control means includes a spring-biased pull cable connected to said control disk for automatically returning the control disk to its original starting position.

7. A device as defined in claim 6 wherein said drive means includes a motor driving said chain drive, said first and said second clutches being connected in parallel with each other.

8. A device as defined in claim 7 wherein said first and second clutches and said brake are electromagnetically actuatable.

9. A device as defined in claim 2 wherein there is a circuit in which said brake is located and which includes a current supply and a switch for interrupting the current supply to the brake in order to render it possible to correct the feed length manually and thereby defining said manually operable means.

10. A device as defined in claim 8 wherein said first and second clutches and said brake are connected into and out of the circuit by means of a two position relay.

11. A device as defined in claim 2 wherein the lower rollers are disk rollers and the disks are stacked transversely of the feed direction.

12. A device as defined in claim 11 comprising a table plate along which the cloth web may be fed and including two troughs at the ends of each of a plurality of slots through which the disks of the lower rollers partly project with the troughs being disposed in front of and behind the disks.

13. A device as defined in claim 2 wherein said upper rollers are mounted in bearings disposed on pivoting arms, spring means being connected to said pivoting arms to bias them so that the upper rollers are biased against the lower rollers.

14. A device as defined in claim 1 comprising switch means for actuating the automatic control means to initiate operation of the feed means, a control device for said switch means and disposed in the vicinity of said cutting means and actuated by said cutting means.

15. A device as defined in claim 14 wherein said control device includes a photocell assembly for actuating said switch means and thereby initiating feeding of the web.

16. A device as defined in claim 14, wherein the control device includes a mechanically operating element for actuating said switch means and for initiating feeding of the web.

17. A device as defined in claim 14 wherein said control device is displaceable in the direction of cutting.

18. A device as defined in claim 16 wherein said cutting means includes a transversely movable shear and said mechanically operating element is disposed at the end of the place where cutting action occurs and including a resilient end piece extending transversely over the entire cutting region, said mechanically operating element upon being engaged by said shear actuating said switch to initiate web feeding.

19. A device as defined in claim 15 wherein said photocell assembly includes a light source and a photocell, the light beam of said photocell extending transversely to the cutting direction and over the cutting region.

20. A device as defined in claim 19 wherein said cutting means includes a control member of opaque material for interrupting the light beam provided by the light source of the photocell assembly and for actuating said switch means.

21. A device as defined in claim 18 wherein said cutting means includes a control member projecting therefrom which engages said mechanical element for actuating said switch means.

22. A device as defined in claim 21 wherein said cutting means control member includes a wire yoke.

23. An automatic device for the transverse cutting of cloth webs to predetermined lengths comprising, in combination:
manually operated cutting means disposed in a cutting region;
feed means for feeding a predetermined length of cloth web to present into the cutting region the portion of cloth where the cut is to be made;
means connected to drive said feed means and including a brake; and
automatic control means for initiating operation of said feed means when actuated and for stopping the feed means after a predetermined length is fed, said control means including means for adjusting the length of web which is intended to be fed upon each advance of the feed means, and manually operable means for disengaging said brake and for permitting correction of a particular length which is fed without changing the feed length to which the control means are adjusted.

24. In a semi-automatic device for the transverse cutting of cloth webs to predetermined lengths having an intermittent feed device which brings the point of separation, i.e., the place where the material is to be cut, into the region of a cutting device which is guided by hand, the improvement comprising that the feed device is in constant engagement with the cloth webs, and including drive means and braking means arranged for selective coupling with the feed device for driving and braking the same, a control device coupled with the feeding device during the feeding of the cloth web for switching on and off the drive means and the braking means, and means for releasing the brake means when the drive means is decoupled from the feed device so as to permit manual movement of the feed device in opposite directions.

References Cited by the Examiner

UNITED STATES PATENTS

| 2,365,605 | 12/1944 | Sutter | 83—249 |
| 2,822,871 | 2/1958 | Malek | 30—228 X |
| 3,165,959 | 1/1965 | Eidson | 83—241 |

FOREIGN PATENTS 549,440  11/1957  Canada.

WILLIAM FELDMAN, *Primary Examiner.*

BERNARD A. GELAK, *Examiner.*

R. V. PARKER, JR., *Assistant Examiner.*